May 5, 1959     J. C. HARNESS     2,885,062
CONVEYOR MECHANISM

Filed April 6, 1956     2 Sheets-Sheet 1

INVENTOR.
JAMES C. HARNESS
BY
ATTORNEY

May 5, 1959

J. C. HARNESS 2,885,062

CONVEYOR MECHANISM

Filed April 6, 1956

2 Sheets-Sheet 2

INVENTOR.
JAMES C. HARNESS
BY
H. O. Clayton
ATTORNEY

United States Patent Office 2,885,062
Patented May 5, 1959

2,885,062
CONVEYOR MECHANISM

James C. Harness, South Bend, Ind., assignor to Bendix Aviation Corporation, South Bend, Ind., a corporation of Delaware Application April 6, 1956, Serial No. 576,574

8 Claims. (Cl. 198—155)

This invention relates in general to a conveyor mechanism and in particular to a conveyor mechanism constructed to transport members, circular in outline, such as disk members, to a certain point and then automatically unload said members one at a time onto a chute.

An important feature of our invention lies in the provision, in an endless conveyor mechanism, of a carrier member so constructed and so cooperative with certain other parts of the mechanism as to automatically unload a plurality of disk members, one at a time and in a certain order, when the carrier member reaches a chute member positioned adjacent the mechanism and adapted to receive the unloaded disk members.

Another important feature of our invention lies in the provision of a disk stock carrier member so constructed that a plurality of disk members carried by the carrier member will, when the carrier member is tilted, leave the carrier member one at a time and in a certain order.

Figure 1:
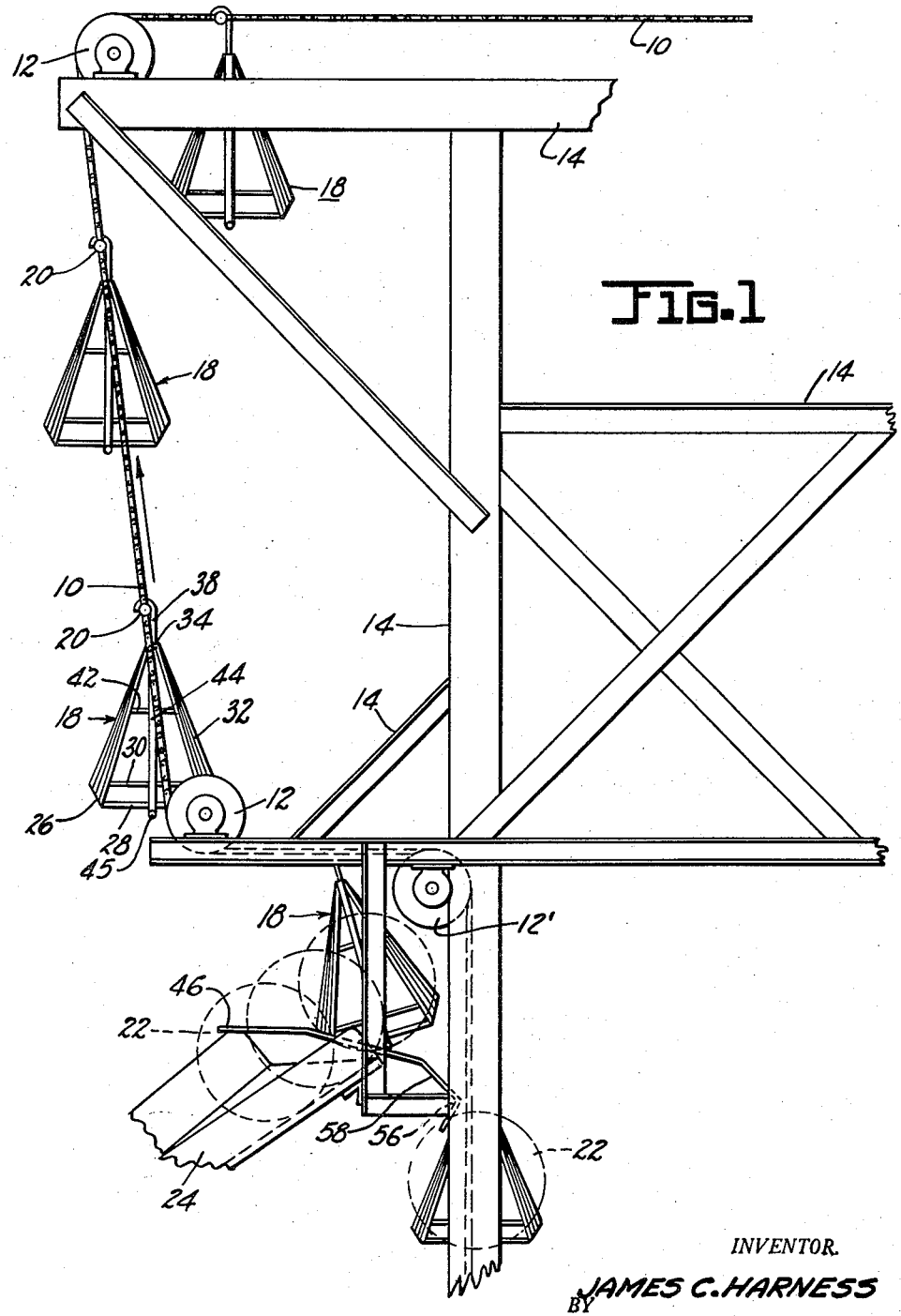
Figure 2:
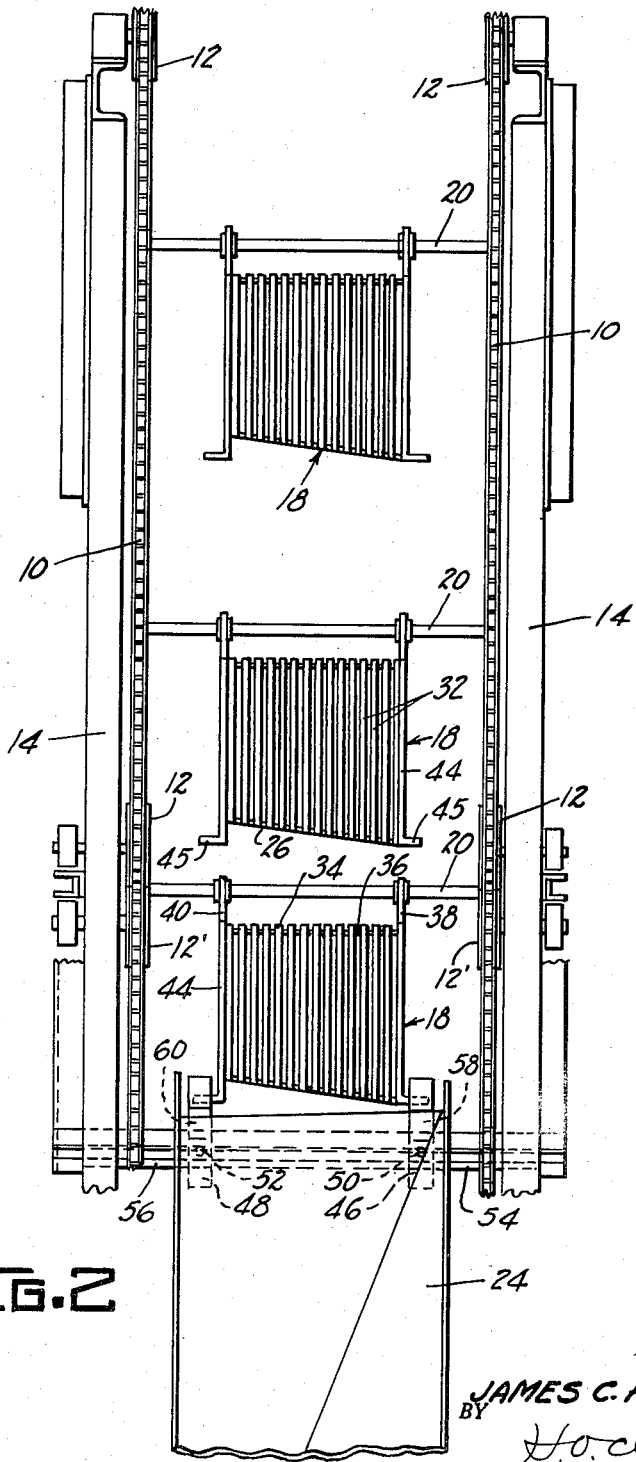

Other objects of the invention and desirable details of construction of parts will become apparent from the following detailed description of an illustrative embodiment of the invention, taken in conjunction with the accompanying drawings illustrating said embodiment, in which:

Figure 1 is a side elevational view of a portion of the carrier and chute mechanism of our invention said portion including the unloader mechanism constituting the most important feature of our invention; and Figure 2 is a front elevational view of the mechanism of Figure 1.

There is disclosed in the two figures of the drawing a preferred embodiment of our invention. Referring to both of said figures, an endless chain mechanism 10, meshing with the cogs of cog wheels 12, serves as a mounting for generally prism shaped carrier members 18. The cog wheels 12 are mounted on a superstructure 14 of suitable design, two of said wheels, indicated by the reference numeral 12', being mounted inwardly from an adjacent wheel as is disclosed in Figure 1; all for a purpose to be described hereinafter. As is disclosed in Figure 2, each carrier member is swingably mounted on a laterally extending rod 20 which is mounted on the two aligned chains of the chain mechanism 10. This mechanism is driven, in the direction indicated by the arrows in Figure 1, by one of the cog wheels 12, not shown, which is in turn driven by a motor, not shown. The carrier units 18 preferably serve to transport a plurality of steel disks 22 from a hot coat cleaning bath, not shown, to a position immediately above a chute member 24. At this point in their travel the disks are unloaded onto the chute where they slide, by the action of gravity, into a press, not shown, there to be shaped as desired.

Our invention is directed in the main to the unloader mechanism disclosed in the figures of the drawing said mechanism including, in general, the particularly shaped carrier member 18 and guide bars cooperating therewith. However, the essence of our invention lies in the construction of the generally prism shaped carrier members 18 whereby, when said members are tipped during their travel, the several spaced apart disks mounted thereon fall out of said carriers in a certain order.

Describing now one of the carrier members 18, the base thereof is in part made up of cylindrically shaped side members 26 which are preferably solid and of equal length. The members 26, as is disclosed in the two figures of the drawing, are inclined upwardly and outwardly looking into the end of the carrier disclosed in Figure 1. The base of the carrier is completed by a member 28, and a member 30 longer than the member 28 and extending parallel thereto. The members 28 and 30 are preferably angular shaped in cross-section; and the four base members together outline a side elevation of a frustrum of a cone, that is a trapezoid. The two sides of the carrier are made up of a plurality of spaced apart rods 32 which are angular shaped in cross-section. Each of said rods goes to make up a portion of the two sides of the carrier; for said rods are bent, at their central portion 34, around a cylindrically shaped solid rod 36 which extends lengthwise of the carrier from one of its ends to the other. The central portions 34 of the rods 32 and the rod 30 together constitute the top portion of the carrier unit. The rod 36 is bent upwardly at its ends at 38 and 40 to form hook members 12 fitting over the rod 20. The rods 32 are preferably fixedly secured to the rod 36 and to the rods 26 as by welding; and the bent rods 32 at the ends of the carrier are preferably welded to the end members 28 and 30.

At the central or substantially central portion of the carrier there are positioned plates 42, generally rectangular in outline, said plates lying in a plane which is parallel to or substantially parallel to the plane of the base of the carrier; and said plates 42 are fixedly secured, as by welding, to the inner sides of the angular shaped side rods 32. Cylindrically shaped solid rods 44, preferably of a diameter greater than the diameter of the rods 26, are mounted on the ends of the carrier said rods being preferably welded at their top portion, to the outermost of the rods 32, to the outermost plates 42, and to the base members 28 and 30; and said rods 44 are bent outwardly at a 90 degree angle at their lower ends for a purpose to be described hereinafter. The bent out portion is indicated by the numeral 45. As is disclosed in part in Figure 1, to load the carriers the disks 22 are positioned side by side in the spaces outlined by the spaced apart rods 32 and plates 42 said disks having a two point support on the rods 26.

As is disclosed in Figure 1 and as will be described hereinafter, the carrier is tipped at a certain point in its circuit of travel said operation being effected in order to dislodge the disks 22 from the carrier and drop the same onto the chute 24. This dropping operation is accomplished by means of two spaced apart guide bars 46 and 48 which are adjustably secured, at 50 and 52 respectively, to support members 54 and 56 respectively. The latter members are suitably secured to uprights of the superstructure 14. The guide bars are preferably so shaped and so mounted with respect to the chute that they extend above the chute a sufficient distance and in a position to insure a falling of the disks 22 onto the chute when the carriers are tipped.

Describing now the complete operation of the mechanism of our invention, the attendant, having started the conveyor in motion, preferably fills each carrier with disks just before it moves into the bath, not shown, operable to clean said disks. The disks having been cleaned, the carriers continue to move in the direction of the arrows, Figure 1, until the bent out portions 45 of the rods 44 contact a portion 58 of the guide bar 46 and a portion 60 of the guide bar 48. As disclosed in Figure 1, continued movement of the two part chain 10 and its cross bars 20 then result in a tipping of the carrier as the bent out portions 45 ride up on the guide bars. Now with this operation the disk nearest the rightward end of the carrier, Figure 2, that is the smaller of the triangular shaped ends of said carrier, is dislodged from said carrier and falls into the chute there to be moved, by the force of gravity, into the press, not shown. This press serves to shape the disk as desired, preferably into a cup shaped member to be later shaped to provide one part of an automotive car brake unit.

Referring to Figure 2, the next disk unit to be dislodged from the carrier and onto the chute is that one positioned next to the aforementioned most rightward disk in a fully packed carrier; this for the reason that its center of gravity, in the fully packed carrier, is lower than the center of gravity of the disk which is dislodged first. With a continued movement of the carrier, and the resulting increase in the tipping angle, there results, in succession, a dislodgement of the remainder of the disks of the carrier the last of said disks dislodged being the most leftward disk of Figure 2; for the center of gravity of the latter disk is, with the carrier in an upright position, lower than the disk to its immediate right and lower than all of the remaining disks. The progressively lower center of gravity of the disks, looking from right to left in Figure 2, is made possible because of the upward and outward inclination of the base members 26, the points of support of said disks lying in the plane of said base members, that is a plane inclinded with respect to the horizontal plane of the entire mechanism; and it is to be noted that the tops of all of the disks lie in a line parallel to the rod 20 thereby insuring the proper immersion of the disks in the cleaning solution, not shown. The guide bars are adjustably mounted to accommodate disks of different diameters.

There is thus provided, by the mechanism of our invention, an effective conveyor for disk stock to be cleaned and then transferred to a chute leading to a press apparatus; and this mechanism includes an unloading mechanism operable to insure a dumping of the several disks of each carrier onto a chute, one at a time, and in a certain order. In the embodiment disclosed in the figures of the drawing, the disk blanks are dumped one at a time from right to left; however, if the base of the carrier were inclined upwardly and outwardly to the right, that is, if the base of the right end of the carrier were wider than the base of the triangular shaped left end of the carrier, then the disks would be dumped from the carrier in a left to right sequence.

While the preferred embodiment of the invention has been described in considerable detail, I do not wish to be limited to the particular construction shown which may be varied within the scope of the invention, and it is the intention to cover hereby all adaptations, modifications and arrangements thereof which come within the practice of those skilled in the art to which the invention relates.

I claim:

1. A conveyor and chute mechanism adapted to transport members circular in outline from one place to another, said members being automatically unloaded, one at a time and in a certain order, onto the chute; said mechanism including, in combination with a chute, a power driven conveyor mechanism comprising a plurality of spaced apart carriers each adapted to carry a plurality of members circular in outline and each being so constructed that the points of support of the circular members therein lie in a plane inclined with respect to the horizontal plane of the mechanism; and means, cooperating with said carriers, when they reach a certain point in their travel, for tilting the same so that the members being transported therein will be dislodged therefrom in the aforementioned manner and fall onto the chute.

2. A conveyor and chute mechanism adapted to convey members circular in outline from one place to another, said members being automatically unloaded, one at a time and in a certain order, onto the chute; said mechanism including, in combination with a chute, a power driven conveyor mechanism comprising a plurality of spaced apart generally prism shaped carriers each adapted to carry a plurality of members circular in outline and each being so constructed that the points of support of the circular members therein lie in a plane inclined with respect to the horizontal plane of the mechanism, and means, cooperating with each of said carriers when it reaches a certain point in its travel, for tilting the same so that the members being conveyed therein will be dislodged therefrom in the aforementioned manner and fall onto the chute.

3. A conveyor and chute mechanism adapted to convey members circular in outline from one place to another, said members being automatically unloaded, one at a time and in a certain order, onto the chute; said mechanism including, in combination with a chute, a power driven endless conveyor mechanism comprising a plurality of spaced apart generally prism shaped carriers each adapted to carry a plurality of members circular in outline and each being so constructed that the points of support of the circular members therein lie in a plane inclined with respect to the horizontal plane of the mechanism, and means, including a plurality of spaced apart guide bars, cooperating with certain laterally extending portions of each of said carriers when they reach a certain point in their travel, for tilting the same so that the members being conveyed therein will be dislodged therefrom in the aforementioned manner and fall onto the chute.

4. An endless conveyor mechanism adapted to cooperate with a chute member in transporting a plurality of disk members from one place to another, said mechanism including a superstructure comprising a plurality of support members, a plurality of cog wheels mounted on certain of the superstructure support members, a chain mechanism, including two spaced apart endless chains, drivably mounted on the cog wheels, spaced apart carrier supporting members secured to the chain members and extending crosswise of and interconnecting said members, a plurality of carrier members swingably mounted on the supporting members, and means, mounted on certain of the superstructure members and cooperating with certain parts of each carrier, for tilting each of said carrier members when said members, during their travel, reach a certain position, that is a position adjacent the chute.

5. An endless conveyor mechanism adapted to cooperate with a chute member in changing the position of a plurality of disk members from one place to another, said mechanism including a superstructure comprising a plurality of parts, a plurality of cog wheels mounted on certain of the stuperstructure parts, a chain mechanism, including two spaced apart endless chains, drivably mounted on the cog wheels, spaced apart carrier supporting members secured to the chain members, and extending crosswise and interconnecting said members, a plurality of carrier members swingably mounted on the supporting members, and means, including two spaced apart guide bars lying in a plane extending normal to the transverse plane of the conveyor mechanism, mounted on certain of the superstructure parts and cooperating with certain parts of each carrier, for tilting each of said carrier members when said members, during their travel, reach a certain position, that is a position adjacent the chute.

6. A generally prism shaped carrier unit adapted to support a plurality of spaced apart members which are circular in outline, said unit including a trapezoid shaped base member, two triangular shaped end members and two generally trapezoid shaped side members, each of said side members including a plurality of spaced apart rods, the members loaded onto the carrier unit being positioned in the spaces between said rods.

7. A generally prism shaped carrier unit including two triangular shaped end members, a trapezoid shaped base member including two side members which incline upwardly and outwardly looking into one of the ends of the carrier unit, and two generally trapezoid shaped side members.

8. A generally prism shaped carrier unit including two triangular shaped end members, a trapezoid shaped base member including two side members which incline upwardly and outwardly looking into one of the ends of the carrier unit, two generally trapezoid shaped side members, and two members, secured in place adjacent the end members, each having a portion thereof extending outwardly from the carrier unit and lying in a plane normal to the plane of the adjacent end member.

References Cited in the file of this patent

UNITED STATES PATENTS

| | | |
|---|---|---|
| D. 127,972 | Replogle | July 1, 1941 |
| 32,620 | Dewey | July 25, 1861 |
| 856,527 | James | June 11, 1907 |
| 2,081,301 | Hudspeth | May 25, 1937 |